(12) United States Patent
Abdellatif et al.

(10) Patent No.: US 11,885,769 B2
(45) Date of Patent: Jan. 30, 2024

(54) UAV FOR CONTINUOUS ULTRASOUND TESTING (UT) SCANS

(71) Applicants: Saudi Arabian Oil Company, Dhahran (SA); KING ABDULLAH UNIVERSITY OF SCIENCE AND TECHNOLOGY, Thuwal (SA)

(72) Inventors: Fadl Abdellatif, Thuwal (SA); Jeff S. Shamma, Champaign, IL (US); Sultan Shaqaq, Dhahran (SA); Abdullah Arab, Dhahran (SA); Abdullah A. Alkhder, Dhahran (SA); Sahejad Patel, Thuwal (SA)

(73) Assignees: SAUDI ARABIAN OIL COMPANY, Dhahran (SA); KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 258 days.

(21) Appl. No.: 17/445,367

(22) Filed: Aug. 18, 2021

(65) Prior Publication Data
US 2023/0058202 A1 Feb. 23, 2023

(51) Int. Cl.
*G01N 29/22* (2006.01)
*B60F 5/02* (2006.01)
(Continued)

(52) U.S. Cl.
CPC ............ *G01N 29/225* (2013.01); *B60F 5/02* (2013.01); *B64U 10/70* (2023.01); *B64U 50/20* (2023.01);
(Continued)

(58) Field of Classification Search
CPC .. B60F 5/02; B64C 37/00; B64U 50/20; B64U 10/70; B64U 60/55; B64U 2101/26
See application file for complete search history.

(56) References Cited

U.S. PATENT DOCUMENTS

| 7,594,448 B2 | 9/2009 | Jacobson et al. |
|---|---|---|
| 8,347,724 B2 | 1/2013 | Brignac |

(Continued)

FOREIGN PATENT DOCUMENTS

| CN | 109703756 A | 5/2019 |
|---|---|---|
| CN | 110329498 A | 10/2019 |
| CN | 110371284 A | 10/2019 |

OTHER PUBLICATIONS

Ultrasonic Inspection Uav; DroneMajor, Mar. 30, 2021; https://dronemajor.net/brands/air-control-entech/products/ultrasonic-inspection-uav, p. 1.

(Continued)

*Primary Examiner* — Philip J Bonzell
*Assistant Examiner* — Colin Zohoori
(74) *Attorney, Agent, or Firm* — Leason Ellis LLP (57) ABSTRACT

An unmanned aerial vehicle (UAV) has a flight-only mode with a motor only rotating propellers and not rotating on-board wheels to configure the UAV to fly away from a surface of a structure, and a crawling-only mode in which the UAV is configured to crawl on the surface due to the motor only rotating the wheels while not rotating the propellers. In the flight-only mode, a clutch disengages a motor from the wheels so that the motor only engages the propellers to fly to lift from the surface. In the crawling-only mode, the clutch disengages the motor from the propellers so that the motor only engages the wheels to move the UAV on the surface.

19 Claims, 6 Drawing Sheets

(51) Int. Cl.
*G05D 1/10* (2006.01)
*G01N 29/04* (2006.01)
*G01N 29/265* (2006.01)
*B64U 10/70* (2023.01)
*B64U 50/20* (2023.01)
*F16D 48/00* (2006.01)
*B64U 10/13* (2023.01)
*B64U 101/26* (2023.01)

(52) U.S. Cl.
CPC ........... *G01N 29/04* (2013.01); *G01N 29/265* (2013.01); *G05D 1/101* (2013.01); *B64U 10/13* (2023.01); *B64U 2101/26* (2023.01); *F16D 48/00* (2013.01); *G01N 2291/023* (2013.01)

(56) References Cited

U.S. PATENT DOCUMENTS

| | | | |
|---|---|---|---|
| 9,550,400 | B2 | 1/2017 | Hutson |
| 11,454,245 | B1* | 9/2022 | Kempshall ............ F04D 25/026 |
| 2008/0048065 | A1* | 2/2008 | Kuntz ...................... B60F 5/02 |
| | | | 244/17.23 |
| 2014/0034776 | A1* | 2/2014 | Hutson ................. F16M 11/18 |
| | | | 244/17.17 |
| 2015/0093956 | A1* | 4/2015 | Mielniczek ............ A63H 27/12 |
| | | | 446/37 |
| 2016/0311282 | A1* | 10/2016 | Nam ......................... B60F 5/02 |
| 2019/0369057 | A1 | 12/2019 | Mattar et al. |
| 2020/0094953 | A1* | 3/2020 | Kondo ................... B64C 37/00 |
| 2020/0174129 | A1 | 6/2020 | Abdelkader et al. |
| 2020/0207469 | A1* | 7/2020 | Benedict ................ B64C 27/20 |
| 2021/0309059 | A1* | 10/2021 | Ker .......................... B60K 6/26 |

OTHER PUBLICATIONS

The Flying STAR robot, a hybrid flying crawling quadcopter robot; May 12, 2019; zarrouk lab; https://www.youtube.com/watch?v=xLuQifpJv_8.

CarCopter, Expendables 3 drone; Jul. 30, 2014; Xerall; https://www.youtube.com/watch?v=abhKyjMqiaw&t=40s.

Ferromagnetic Pipe Climbing Robot; Jun. 22, 2019; Crazy Engineer; https://www.arnabkumardas.com/platforms/raspberry-pi/ferromagnetic-pipe-climbing-robot-omnidirectional-raspberry-pi-robot/.

RC WIFI 2.4G Multi-Functional Folding Quadcopter Helicopt; Mar. 30, 2021; joom; https://www.joom.com/en/products/5d81c2c08b2c3701015d76e9.

* cited by examiner

UAV FOR CONTINUOUS ULTRASOUND TESTING (UT) SCANS

FIELD OF THE DISCLOSURE

The present disclosure relates generally to an unmanned aerial vehicle (UAV), and, more particularly, to a UAV having a flight-only mode and a crawling-only mode.

BACKGROUND OF THE DISCLOSURE

Known UAVs are capable of both flying in a flight mode and crawling on a surface of a structure in a perch mode. Such UAVs have at least one propeller and at least one wheel. A first respectively motor is attached to each propeller and configured to rotate the propeller in the flight mode. A second respective motor is attached to each wheel and configured to rotate the wheel in the perch mode. However, the use of two motors for each propeller-and-wheel combination increases the energy consumption of the UAV. Such increased energy consumption can require more or larger batteries, which increases the overall weight of the UAV. Furthermore, the use of two motors for each propeller-and-wheel combination in itself increases the overall weight of the UAV. Such excessive weight can also decrease the stability of the UAV during flight mode and during perch mode. In addition, the excessive weight increases the cost and complexity of the manufacture of the UAV.

SUMMARY OF THE DISCLOSURE

According to an embodiment consistent with the present disclosure, a UAV has a flight-only mode with a motor only rotating propellers and not rotating wheels to configure the UAV to fly away from a surface of a structure, and a crawling-only mode only rotating wheels with the UAV configured to crawl on the surface while not rotating the propellers. In the flight-only mode, a clutch disengages a motor from the wheels so that the motor only engages the propellers to fly away from the surface. In the crawling-only mode, the clutch disengages the motor from the propellers so that the motor only engages the wheels to move the UAV on and along the surface. The use of such a clutch for flight-only mode and crawling-only mode removes the need for implementing a motor for each of the propeller and the wheel. Accordingly, the use of such a clutch improves the energy consumption of the UAV as well as decreases the overall weight of the UAV.

In an embodiment, a UAV comprises a probe configured to scan a structure, a processor having code therein configured to control the scanning by the probe, a chassis configured to retain the processor and the probe, and an arm extending from the chassis and having a clutch, a motor, a propeller, a power transmission sub-system, and a wheel mounted thereon. The clutch is configured to selectively couple the motor to the propeller and to not couple the motor to the power transmission sub-system in a first configuration, and configured to selectively couple the motor to the power transmission sub-system and to not couple the motor to the propeller in a second configuration. The propeller in the first configuration moves the UAV away from a surface of the structure. The power transmission sub-system rotates the wheel in the second configuration to move the UAV on the surface.

The processor controls the clutch to switch between the first and second configurations. The processor also controls the motor in the first configuration to rotate the propeller in a flight mode. In addition, the processor controls the motor in the second configuration to control the power transmission sub-system to rotate the wheel in a perch mode. The UAV crawls over the structure in the perch mode. The UAV further comprises a leg extending from the arm with the wheel attached to the leg. The leg can include at least one hinge. The leg, when provided, is configured to bend about the at least one hinge to extend the leg around a portion of the structure. In the first configuration, the propeller rotates about the rotary axis, and the power transmission sub-system does not rotate the wheel. In the second configuration, the power transmission sub-system rotates the wheel, and the propeller does not rotate about the rotary axis.

In another embodiment, a UAV comprises a probe configured to scan a structure, a processor having code therein configured to control the scanning by the probe, a chassis configured to retain the processor and the probe, an arm extending from the chassis, a motor mounted on the arm, a propeller mounted on the arm and configured to rotate about a rotary axis, a power transmission sub-system mounted on the arm and coupled to a wheel to rotate the wheel, and a clutch configured to selectively couple the motor to the propeller and to not couple the motor to the power transmission sub-system in a first configuration, and configured to selectively couple the motor to the power transmission sub-system and to not couple the motor to the propeller in a second configuration. The propeller in the first configuration moves the UAV away from a surface of the structure. The power transmission sub-system rotates the wheel in the second configuration to move the UAV on and along the surface.

The processor controls the clutch to switch between the first and second configurations. The processor also controls the motor in the first configuration to rotate the propeller in a flight mode. In addition, the processor controls the motor in the second configuration to control the power transmission sub-system to rotate the wheel in a perch mode. The UAV crawls over the structure in the perch mode. The power transmission sub-system rotates the wheel in the second configuration to traverse the probe adjacent to the structure. The propeller rotates about the rotary axis, and the power transmission sub-system does not rotate the wheel in the first configuration. The power transmission sub-system rotates the wheel, and the propeller does not rotate about the rotary axis in the second configuration.

In a further embodiment, a method comprises providing a UAV having a probe, a clutch, a motor, a propeller, a power transmission sub-system, and a wheel; controlling the clutch to selectively couple the motor to the propeller and to not couple the motor to the power transmission sub-system in a flight mode; flying the UAV to be spaced from a location on a surface of a structure; landing the UAV at the location on the surface; controlling the clutch to selectively couple the motor to the power transmission sub-system and to not couple the motor to the propeller in a perch mode; controlling the power transmission sub-system to rotate the wheel; traversing the wheel over the surface the structure; and scanning the structure using the probe. The method further comprises switching the clutch between the flight mode and the perch mode. In the flight mode, the propeller rotates about the rotary axis, and the power transmission sub-system does not rotate the wheel. In the perch mode, the power transmission sub-system rotates the wheel, and the propeller does not rotate about the rotary axis.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a UAV 10 which has a flight-only mode with a motor only rotating propellers and not rotating wheels to configure the UAV 10 to fly away from a surface of a structure, and a crawling-only mode only rotating wheels with the UAV 10 configured to crawl on and along the surface while not rotating the propellers. In the flight-only mode, a clutch disengages a motor from the wheels so that the motor only engages the propellers to fly away from the surface. In the crawling-only mode, the clutch disengages the motor from the propellers so that the motor only engages the wheels to move the UAV 10 on and along the surface.

Figure 1:
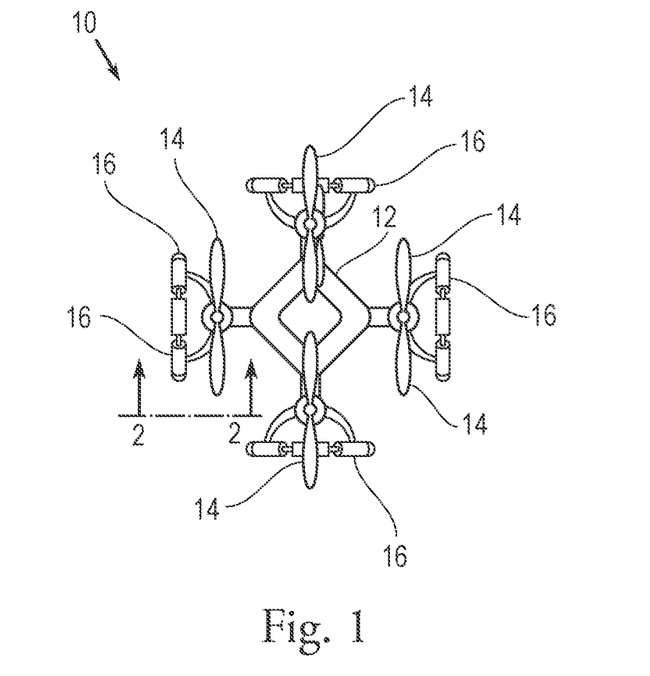
FIG. 1 is a top view of a UAV, according to an embodiment.

Referring to FIG. 1, the UAV 10 includes a frame 12, at least one propeller 14, and at least one wheel 16. The propeller 14 is rotationally coupled to the frame 12, allowing the propeller 14 to rotate about an axle in a flight-only mode. With the propeller 14 rotating while the UAV 10 is in the flight-only mode, the propeller 14 moves the UAV 10 to be spaced away from a surface 11 of a structure. By being spaced a controllable, finite distance from the structure during the flight-only mode, the UAV 10 can fly above and along the structure. Alternatively, the UAV 10 can fly underneath the structure at a spaced, controlled distance. In addition, the UAV 10 can fly to the side of the structure. Furthermore, the UAV 10 can fly to a position anywhere relative to the structure, with the UAV 10 being separated and apart from the surface 11 of the structure by a finite distance during the flight-only mode.

The wheel 16 is also rotationally coupled to the frame 12, allowing the wheel 16 to rotate about an axle in a crawl-only mode. With the wheel 16 rotating while the UAV 10 is in the crawl-only mode, the wheel 16 moves the UAV 10 on the surface 11, so that the UAV 10 crawls along the surface. The wheel 16 can be an omni-directional wheel configured to allow the wheel 16, and thence the UAV 10, to crawl in any direction on the surface 11 of the structure. For example, the wheel 16 can be a mecanum wheel. In an alternative embodiment, if the surface 11 is ferromagnetic, the wheel 16 can include at least one magnet to provide removable adhesion of the wheel 16 to the surface 11. Also, a magnet can be mounted in the chassis 18, such as in the underbelly, close to the surface 11, to provide removable adhesion of the UAV 10 to the surface 11. As described below, a probe 20 of the UAV 10 is disposed adjacent to or in contact with the surface 11 and scans the structure as the UAV 10 crawls along the surface 11 of the structure. In an embodiment, the probe 20 can include a magnet for removable adhesion to the surface 11.

Figure 2:
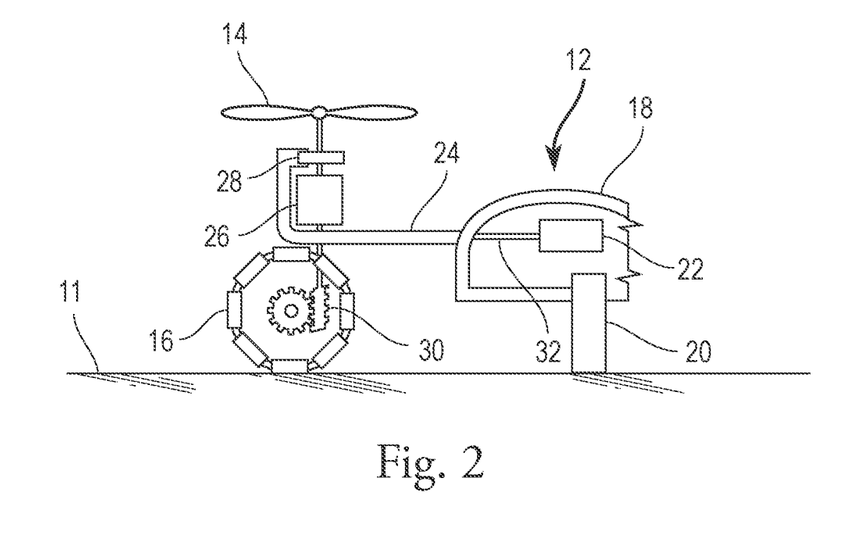
FIG. 2 is a side cross-sectional view of the UAV of FIG. 1 along lines 2-2.

Referring to FIG. 2, the frame 12 further includes a chassis 18 retaining the probe 20, a processor 22, and at least one arm 24 extending from the chassis 18. A motor 26 and a clutch 28 as well as the propeller 14 are mounted to a distal end of the arm 24. The propeller 14 is mounted to selectively engage the top of the clutch 28, and a power transmission sub-system is mounted to selectively engage the bottom of the clutch 28. In an example embodiment, the power transmission sub-system is a worm gear drive 30. The wheel 16 is mounted to the worm gear drive 30. The worm gear drive 30 is configured to rotate upon rotation of a shaft of the motor 26, and to transfer its rotational motion to the wheel 16 to rotate the wheel 16. Alternatively, instead of the worm gear drive 30, other known types of power transmission sub-systems can be used to transfer the rotation of the shaft of the motor 26 to the wheel 16, such as any known power transmission mechanism between the motor 26 and the wheel 16, including gear reduction mechanisms. The probe 20 is positioned on an underside of the chassis 18. As the UAV 10 with the chassis 18 crawls along the surface of the structure, the probe 20 is configured to be adjacent to the surface in order to scan the structure.

The processor 22 has code therein configured to control the scanning by the probe 20. During scanning, the probe 20 generates signals conveyed to the processor 22. The processor 22 can include memory configured to store the signals. The processor 22 can further process the stored signals. Alternatively, the processor 22 can include a transmitter configured to transmit the signals to an external device. The external device can further process the stored signals. For example, the probe 20 can generate ultrasonic waves which are output toward the structure. The structure can then generate reflected ultrasonic waves which are received by the probe 22. Thus, the probe 20 can perform ultrasonic testing (UT) scans of the structure. As the UAV 10 crawls along the surface, the probe 20 can perform continuous UT scans of the structure.

The chassis 18 also includes a control line 32 extending from the processor 22 and through the arm 24 to the clutch 28. The clutch 28 includes a servomechanism 34 configured to change the configuration of the clutch 28 in relation to the motor 26 as well as the propeller 14 and the worm gear drive 30. The processor 22 sends control signals through the control line 32 to operate the servomechanism 34 to change the configuration of the clutch 28.

Figure 3:
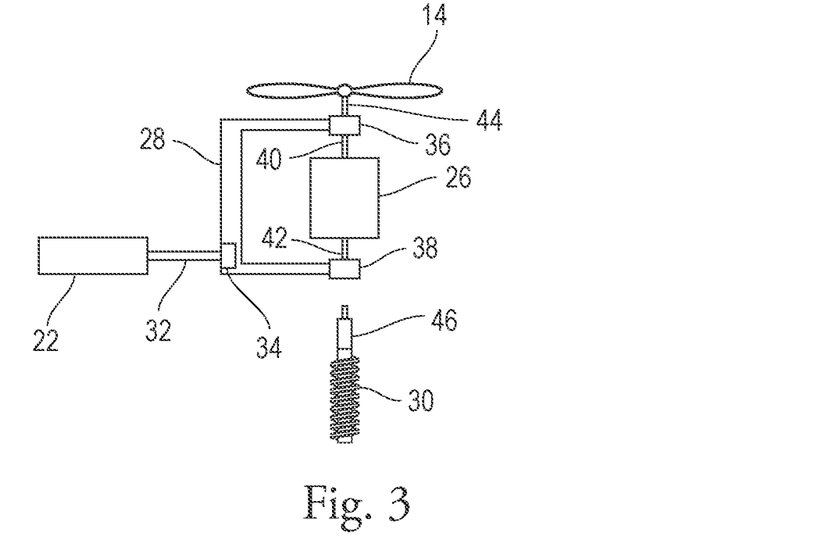
FIG. 3 is a side view of the components of the UAV of FIG. 1 in a flight-only mode.

As shown in FIG. 3, under control of the processor 22, the servomechanism 34 changes the clutch 28 to be in a first configuration. In the first configuration, the clutch 28 is configured to selectively couple the motor 26 to the propeller 14 and to not couple the motor 26 to the worm gear drive 30. In greater detail, the clutch 28 has a first end 36 and a second end 38. Each end 36, 38 is connected to a respective axle 40, 42 of the motor 26. In the first configuration, the first end 36 of the clutch 28 connects the axle 40 of the motor 26 to the shaft 44 of the propeller 14, and the second end 38 of the clutch 28 is not connected to the shaft 46 of the worm gear drive 30. Thus, in the first configuration, the motor 26 only rotates the propeller 14 and does not rotate the worm gear drive 30, and so the wheel 16 does not rotate. Accordingly, the propeller 14 in the first configuration moves the UAV 10 to fly at a finite distance away from a surface of the structure in a flight-only mode. Since the motor 26 does not rotate the worm gear drive 30 and its connected wheel 16, energy is saved in rotating only the propeller 14 in the flight-only mode.

Moreover, the arrangement described herein does not require pivoting of the propellers from their nominal position when in the first configuration to a second configuration, such as pivoting to a perpendicular orientation to cause a thrust along the direction of the surface. Rather, the claimed arrangement uses a clutch arrangement to transfer energy from a single motor unit between flight and crawling modes to reduce parts, complexity and weight of the UAV.

Figure 4:
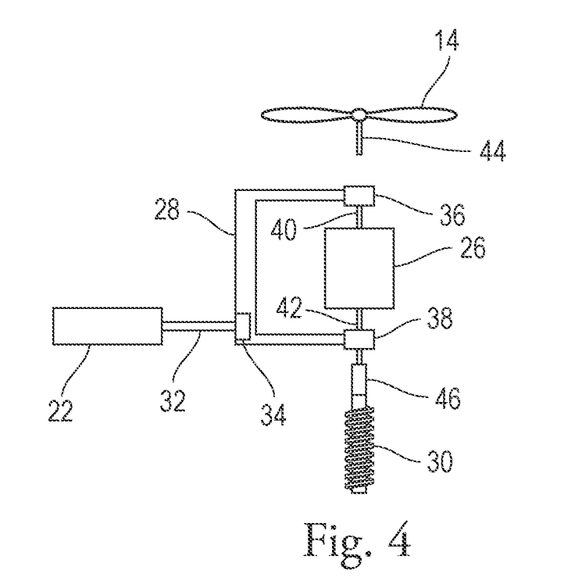
FIG. 4 is a side view of the components of the UAV of FIG. 1 in a crawl-only mode.

As shown in FIG. 4, under control of the processor 22, the servomechanism 34 changes the clutch 28 to be in a second configuration. In the second configuration, the clutch 28 is configured to selectively couple the motor 26 to the worm gear drive 30 and to not couple the motor 26 to the propeller 14. In greater detail, in the second configuration, the first end 36 of the clutch 28 is not connected to the axle 40 to the shaft 44 of the propeller 14, and the second end 38 of the clutch connects the axle 42 of the motor 26 to the shaft 46 of the worm gear drive 30. Thus, in the second configuration, the motor 26 only rotates the worm gear drive 30, and so the wheel 16 rotates, but the motor 26 does not rotate the propeller 14. Accordingly, the worm gear drive 30 and its connected wheel 16 in the second configuration move the UAV 10 to perch on the surface of the structure and to crawl on the surface in a crawl-only mode. Since the motor 26 does not rotate the propeller 14, energy is saved in rotating only the wheel 16 in the crawl-only mode.

Alternatively, other known clutch mechanisms can be included in the UAV 10 to selectively couple the motor 26 to the propeller 14 and to not couple the motor 26 to the worm gear drive 30 in a first configuration of the UAV 10, and to selectively couple the motor 26 to the worm gear drive 30 and to not couple the motor 26 to the propeller 14 in the second configuration of the UAV 10. For example, two independent clutches can be provided. For instance, a first clutch can be on top and a second clutch on the bottom. Each clutch, when more than one is provided, is actuated independently, for example, using electromagnetic coils. In an example embodiment shown in FIGS. 6-7, each clutch 100 has a driven disk 102 connected to the shaft 42 of the motor 26 and the driven disk 102 rotates with the shaft 42. A friction disk 104 is mounted on the driven disk 102 in a way which allows the friction disk 104 to freely move axially up and down, but the friction disk 104 is forced to rotate with the driven disk 102 using, for example, locking pins 106. Resilient members 108 such as tension springs provide a biasing force down and away from the output disk 110. An output shaft 112 is connected to the output disk 110. At least one electromagnetic coil 114 is positioned near the friction disk 104, with electrical power provided by coil wires 116. When energized, the electromagnetic coil 114 attracts the friction disk 104 and overcomes the downward biasing force to having the friction disk 104 engage the output disk 110 by the force of friction.

Figure 6:
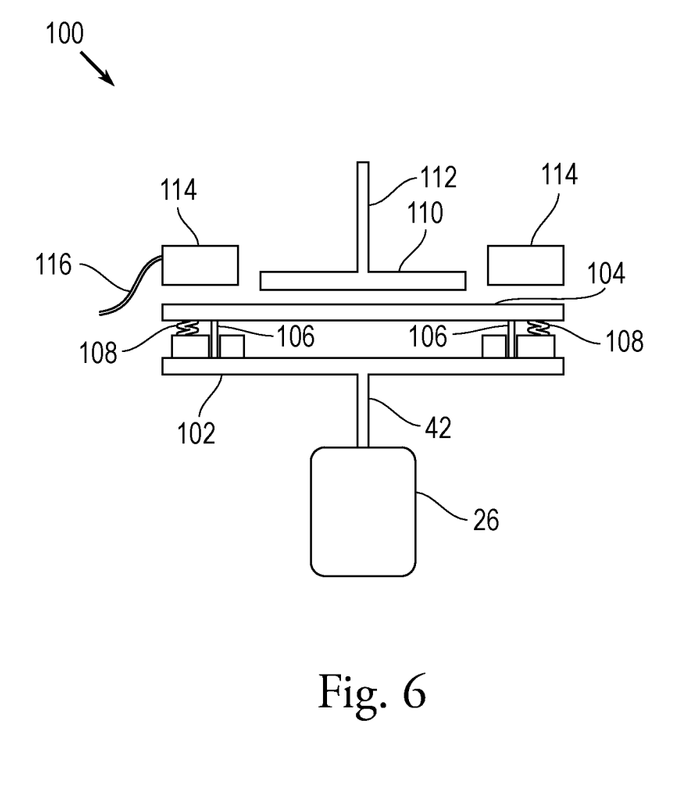
FIGS. 6-11 are side views of alternative embodiments of clutch mechanisms.
Figure 7:
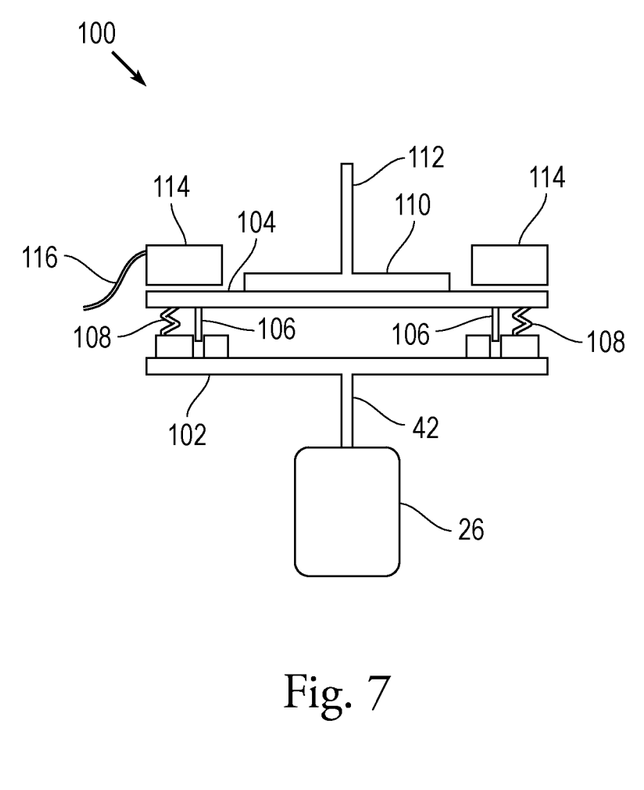

FIG. 6 illustrates the clutch 100 with the electromagnetic coil 114 not energized. In this mode, the friction disk 104 is not attracted and the biasing force is not overcome, with the friction disk 104 not engaging the output disk 110. Accordingly, with the electromagnetic coil 114 off, the output disk 110 with the output shaft 112 is disengaged from the friction disk 114. In such a mode, the output shaft 112 is disengaged from the driven disk 102 attached to the motor shaft 42, and so the motor 26 does not rotate the output shaft 112. FIG. 7 illustrates the clutch 100 with the electromagnetic coil 114 energized, so that the friction disk 104 is attracted and the biasing force is overcome, with the friction disk 104 engaging the output disk 110. Accordingly, with the electromagnetic coil 114 on, the output disk 110 with the output shaft 112 engages the friction disk 114. In such a mode, the output shaft 112 engages the driven disk 102 attached to the motor shaft 42, and so the motor 26 rotates the output shaft 112.

Figure 8:
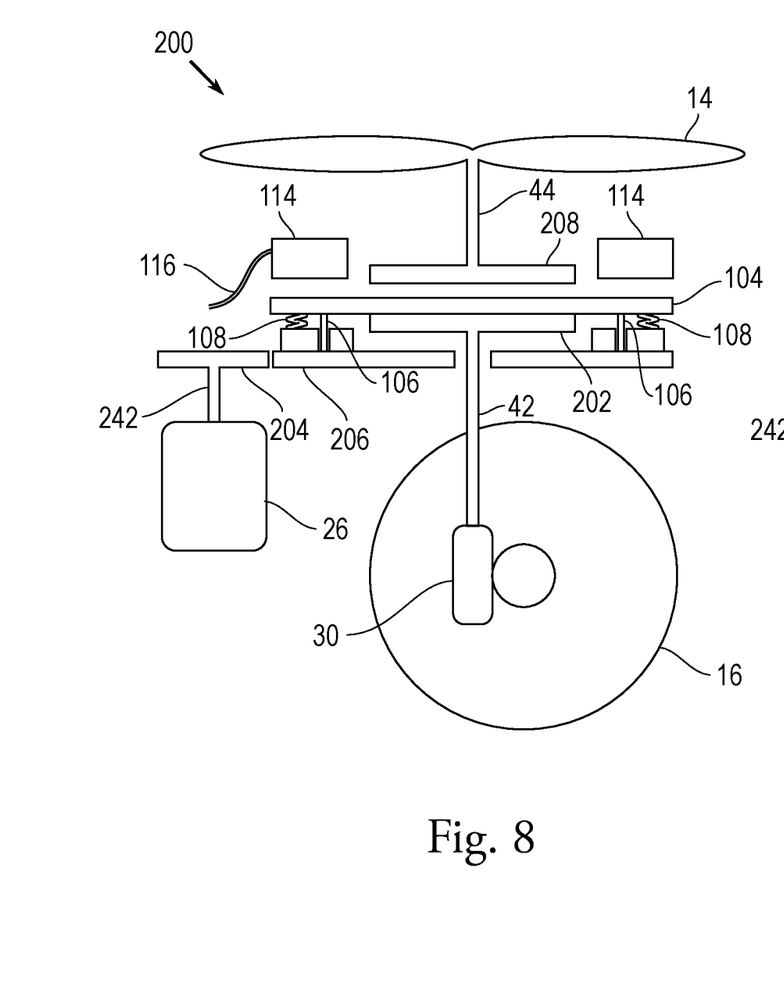

In alternative embodiments shown in FIGS. 8-11, a single dual-output clutch has two mechanical outputs, such that when an electromagnetic coil is energized, a first output is engaged. Otherwise, when the electromagnetic coil is not energized, a second output is engaged. Referring to a first embodiment of a single dual-output clutch 200 shown in FIGS. 8-9, the motor 26 is an off-center geared motor which rotates a lower disk 202 as a driven disk by driving a pinion or first gear 204. The first gear 204 meshes with the lower disk 202 having a second gear 206 of the lower disk 202. As shown in FIG. 8, when the electromagnetic coil 114 is not energized, the biasing force of the resilient member 108 is overcome, causing frictional contact between the lower disk 202 and the friction disk 104, thus turning the wheel shaft 42 and driving the worm gear 30 to rotate the wheel 16. In this configuration shown in FIG. 8, the propeller 14 and the shaft 44 are disengaged from the friction disk 104 turned by the motor 26.

Figure 9:
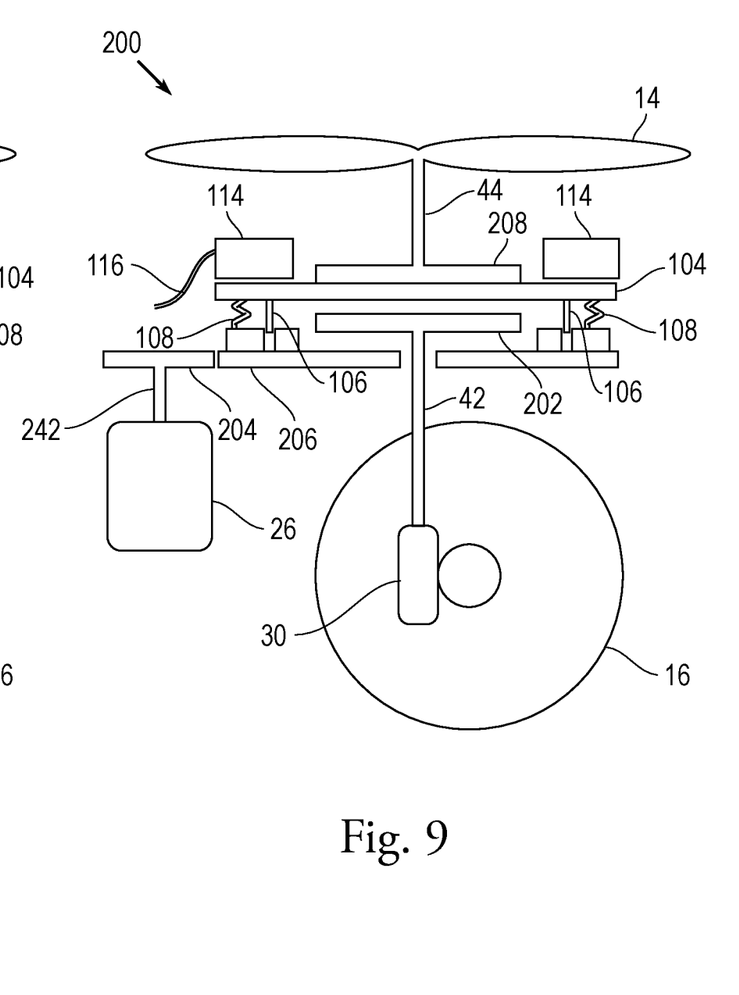

As shown in FIG. 9, when the electromagnetic coil 114 is energized, the biasing force of the resilient member 108 moves the friction disk 104 to be in frictional contact with the upper disk 208, thus turning the shaft 44 of the propeller 14 and rotating the propeller 14. In this configuration shown in FIG. 9, the worm gear 30 and the wheel shaft 42 are disengaged from the friction disk 104 turned by the motor 26, and so the wheel 14 does not rotate.

Figure 10:
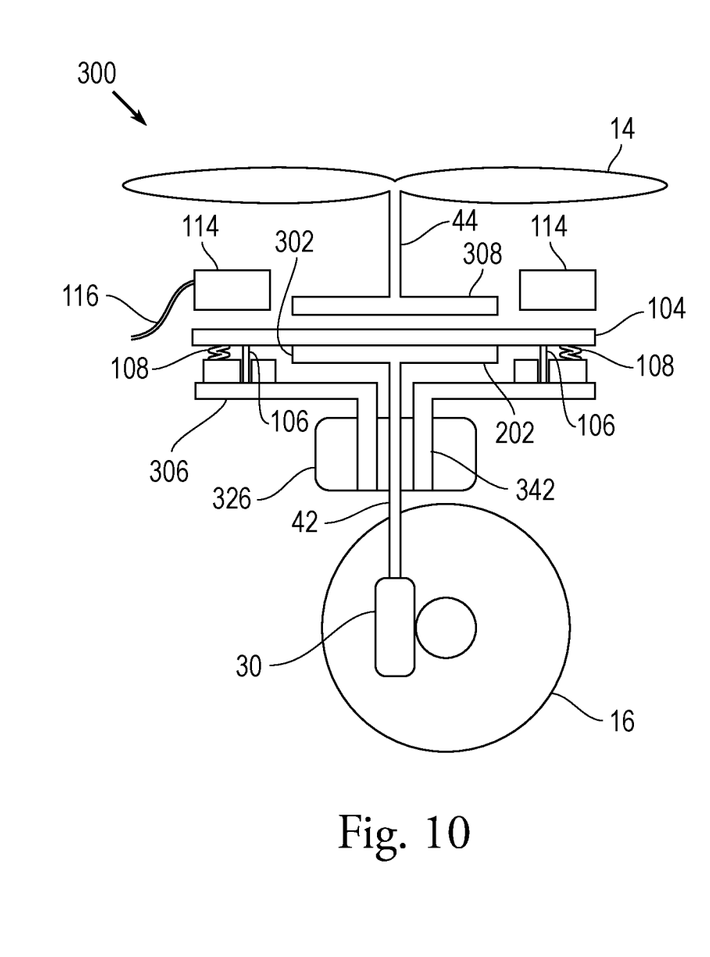
Figure 11:
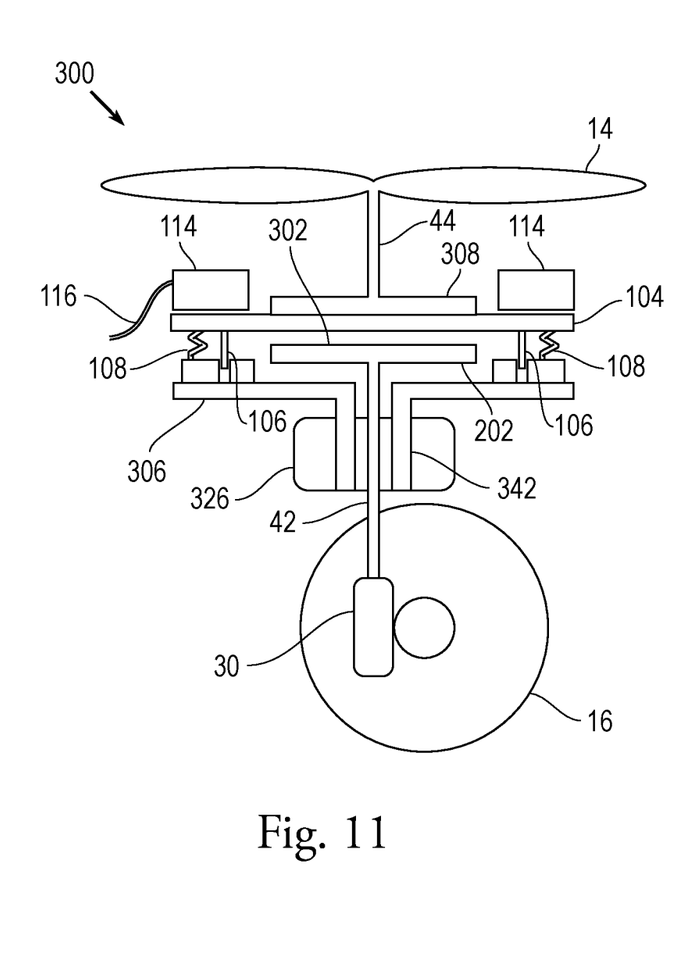

In an alternative embodiment shown in FIGS. 10-11, a single dual-output clutch 300 has a direct-drive motor 326 having a hollow shaft 342. The hollow shaft 342 is connected directly to the driven disk 306, such that rotation of the hollow shaft 342 rotates the driven disk 306. The wheel shaft 42 passes through the hollow shaft 342 of the motor 326 without contacting the hollow shaft 342. Such a configuration of the direct-drive motor 326 and a hollow shaft 342 causes the clutch 300 to be compact and lightweight.

As shown in FIG. 10, when the electromagnetic coil 114 is not energized, the biasing force of the resilient member 108 is overcome, causing frictional contact between the lower disk 302 and the friction disk 104, thus turning the wheel shaft 42 and driving the worm gear 30 to rotate the wheel 16. In this configuration shown in FIG. 10, the propeller 14 and the shaft 44 are disengaged from the friction disk 104 turned by the motor 326.

As shown in FIG. 11, when the electromagnetic coil 114 is energized, the biasing force of the resilient member 108 moves the friction disk 104 to be in frictional contact with the upper disk 308, thus turning the shaft 44 of the propeller 14 and rotating the propeller 14. In this configuration shown in FIG. 11, the worm gear 30 and the wheel shaft 42 are disengaged from the friction disk 104 turned by the motor 326, and so the wheel 14 does not rotate.

Figure 5:
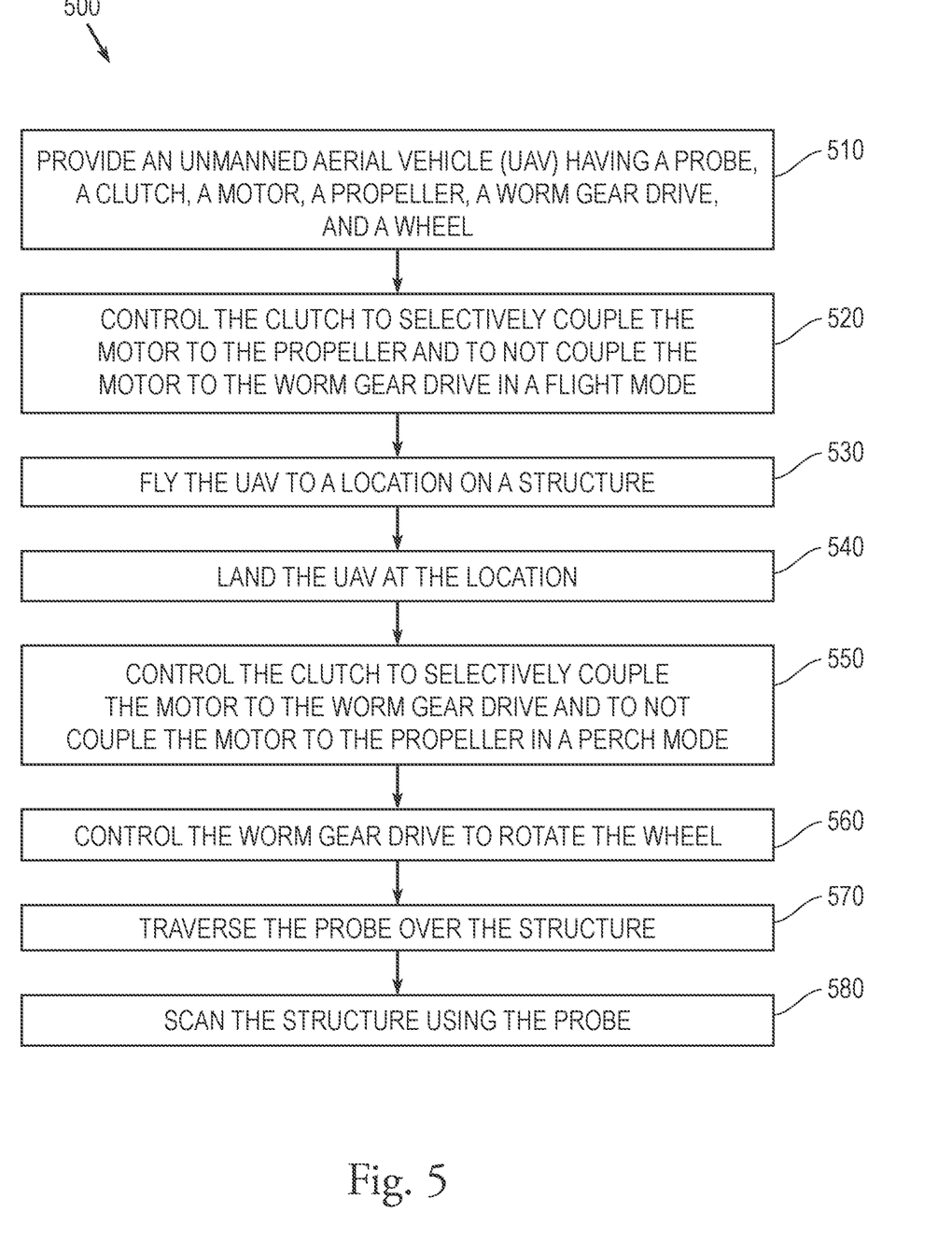
FIG. 5 is a flowchart of a method of operation of the UAV, according to the embodiment.

As shown in FIG. 5, a method 500 includes the step 510 of providing the UAV 10 having the probe 20, the clutch 28, the motor 26, the propeller 14, the worm gear drive 30, and the wheel 16. The method 500 controls the clutch 28 in step 520 to selectively couple, in a first configuration, the motor 26 to the propeller 14 and to not couple the motor 26 to the worm gear drive in a flight-only mode. The UAV 10 then flies to a location on a structure in step 530. As the UAV 10 files, the wheel 16 is not coupled to the motor 26, and so the wheel 16 does not rotate. The UAV 10 then lands at the location on a surface of the structure to be in perch mode in step 540. The method 500 then controls the clutch 28 in step 550 to selectively couple, in a second configuration, the motor 26 to the worm gear drive 30 and to not couple the motor 26 to the propeller 14 in the perch mode. The method 500 then controls the worm gear drive 30 in step 560 to rotate the wheel 16. During step 560, the UAV 10 is in crawl-only mode to crawl on the surface of the structure. As the UAV 10 crawls, the propeller 14 is not coupled to the motor 26, and so the propeller 14 does not rotate. Furthermore, as the UAV 10 crawls, the probe 20 traverses over the structure in step 570, and the probe 20 scans the structure in step 580. For example, the probe 20 can be an ultrasonic probe configured to perform continuous UT scans of the structure as the probe 20 traverses the structure.

Therefore, the use of such a clutch 28 in a first configuration and a second configuration, configured to operate the UAV 10 in flight-only mode and crawling-only mode, respectively, removes the need for implementing a motor for each of the propeller 14 and the wheel 16. Accordingly, the use of such a clutch 28 improves the energy consumption of the UAV 10 as well as decreases the overall weight of the UAV 10. For example, the UAV 10 can use smaller or fewer batteries to provide power to the UAV 10, which reduces the weight of the UAV 10. In addition, fewer motors are needed, since a single motor 26 can be used for each propeller-and-wheel combination, instead of implementing a pair of motors, with a first motor configured to operate each propeller as well as a second motor configured to operate each wheel.

The UAV 10 can maneuver, under the control of the processor 22 to fly to the surface 11 of the structure in flight-only mode, land on the surface 11 in perch mode, and crawl along the surface 11 in crawling-only mode. As the UAV 10 crawls, the probe 20 traverses the surface 11 and scans the structure. In an alternative embodiment, the UAV 10 includes a leg extending from the arm 24, with the wheel 16 attached to the leg. The leg can include at least one hinge, with the leg configured to bend about the at least one hinge. Such bending of the leg allows the leg to extend around a portion of the structure to stabilize the probe 20 during scanning of the structure as the UAV 10 crawls along the surface 11. In addition, the bendable leg can facilitate crawling of the UAV 10 in different directions, such as circumferentially around a pipe as the structure. Such circumferential crawling allows the probe 20 to scan different portions of the pipe for more comprehensive and continuous scanning.

Portions of the methods described herein can be performed by software or firmware in machine readable form on a tangible (e.g., non-transitory) storage medium. For example, the software or firmware can be in the form of a computer program including computer program code adapted to cause the UAV to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An unmanned aerial vehicle (UAV), comprising:
a probe configured to scan a structure;
a processor having code therein configured to control the scanning by the probe;
a chassis configured to retain the processor and the probe; and
an arm extending from the chassis and having a clutch, a motor, a propeller configured to rotate about a vertical rotary axis, a power transmission sub-system, and a wheel mounted thereon, wherein the clutch is configured to selectively move vertically parallel to the vertical rotary axis in a first direction to selectively couple the motor to the propeller and to not couple the motor to the power transmission sub-system in a first configuration, and configured to selectively move vertically parallel to the vertical rotary axis in a second direction opposite to the first direction to selectively couple the motor to the power transmission sub-system and to not couple the motor to the propeller in a second configuration, wherein the propeller in the first configuration moves the UAV away from a surface of the structure, and wherein the power transmission sub-system rotates the wheel in the second configuration to move the UAV on and along the surface.

2. The UAV of claim 1, wherein the processor controls the clutch to switch between the first and second configurations.

3. The UAV of claim 1, wherein the processor controls the motor in the first configuration to rotate the propeller in a flight mode.

4. The UAV of claim 1, wherein the processor controls the motor in the second configuration to control the power transmission sub-system to rotate the wheel in a perch mode.

5. The UAV of claim 4, wherein the UAV crawls over the structure in the perch mode.

6. The UAV of claim 1, wherein, in the first configuration, the propeller rotates about the rotary axis, and the power transmission sub-system does not rotate the wheel.

7. The UAV of claim 1, wherein, in the second configuration, the power transmission sub-system rotates the wheel, and the propeller does not rotate about the rotary axis.

8. An unmanned aerial vehicle (UAV), comprising:
a probe configured to scan a structure;
a processor having code therein configured to control the scanning by the probe;
a chassis configured to retain the processor and the probe;
an arm extending from the chassis;
a motor mounted on the arm;
a propeller mounted on the arm and configured to rotate about a vertical rotary axis;
a power transmission sub-system mounted on the arm and coupled to a wheel to rotate the wheel; and
a clutch configured to selectively move vertically parallel to the vertical rotary axis in a first direction to selectively couple the motor to the propeller and to not couple the motor to the power transmission sub-system in a first configuration, and configured to selectively move vertically parallel to the vertical rotary axis in a second direction opposite to the first direction to selectively couple the motor to the power transmission sub-system and to not couple the motor to the propeller in a second configuration, wherein the propeller in the first configuration moves the UAV away from a surface of the structure, and wherein the power transmission sub-system rotates the wheel in the second configuration to move the UAV on and along the surface.

9. The UAV of claim 8, wherein the processor controls the clutch to switch between the first and second configurations.

10. The UAV of claim 8, wherein the processor controls the motor in the first configuration to rotate the propeller in a flight mode.

11. The UAV of claim 8, wherein the processor controls the motor in the second configuration to control the power transmission sub-system to rotate the wheel in a perch mode.

12. The UAV of claim 11, wherein the UAV crawls over the structure in the perch mode.

13. The UAV of claim 8, wherein the power transmission sub-system rotates the wheel in the second configuration to traverse the probe adjacent to the structure.

14. The UAV of claim 8, wherein the propeller rotates about the rotary axis, and the power transmission sub-system does not rotate the wheel in the first configuration.

15. The UAV of claim 8, wherein the power transmission sub-system rotates the wheel, and the propeller does not rotate about the rotary axis in the second configuration.

16. A method, comprising:
providing an unmanned aerial vehicle (UAV) having a probe, a clutch, a motor, a propeller configured to rotate about a vertical rotary axis, a power transmission sub-system, and a wheel;
controlling the clutch to selectively move vertically parallel to the vertical rotary axis in a first direction to selectively couple the motor to the propeller and to not couple the motor to the power transmission sub-system in a flight mode;
flying the UAV to be spaced from a location on a surface of a structure;
landing the UAV at the location on the surface;
controlling the clutch to selectively move vertically parallel to the vertical rotary axis in a second direction opposite to the first direction to selectively couple the motor to the power transmission sub-system and to not couple the motor to the propeller in a perch mode;
controlling the power transmission sub-system to rotate the wheel;
traversing the wheel over and along the surface the structure; and
scanning the structure using the probe.

17. The method of claim 16, further comprising:
switching the clutch between the flight mode and the perch mode.

18. The method of claim 16, wherein, in the flight mode, the propeller rotates about the rotary axis, and the power transmission sub-system does not rotate the wheel.

19. The method of claim 16, wherein, in the perch mode, the power transmission sub-system rotates the wheel, and the propeller does not rotate about the rotary axis.

* * * * *